United States Patent [19]

Redman

[11] 4,263,940
[45] Apr. 28, 1981

[54] MIXING VALVE

[76] Inventor: James C. Redman, R.D. #1, Hadley, Pa. 16130

[21] Appl. No.: 65,221

[22] Filed: Aug. 9, 1979

[51] Int. Cl.³ .................. F16K 11/02; F16K 51/00
[52] U.S. Cl. .............................. 137/625.17; 137/315
[58] Field of Search ............ 137/636.4, 625.17, 625.4, 137/315

[56] References Cited

U.S. PATENT DOCUMENTS

| 1,833,653 | 11/1931 | Martin | 137/636.4 |
| 1,898,952 | 2/1933 | Gray | 137/636.4 |
| 2,975,806 | 3/1961 | Moen | 137/625.17 |
| 3,282,295 | 11/1966 | Skriletz et al. | 137/625.17 |
| 3,568,719 | 3/1971 | Bonomi | 137/636.4 |
| 3,726,317 | 4/1973 | Moen | 137/625.17 |

Primary Examiner—Martin P. Schwadron
Assistant Examiner—A. Michael Chambers
Attorney, Agent, or Firm—Webster B. Harpman

[57] ABSTRACT

A mixing valve has a cylindrical body member with inlet and outlet passages in spaced relation to one another. A control stem is movably positioned within the body member which defines a mixing chamber. A split expandable sleeve in the chamber is movable by the control stem to provide for regulation of outlet fluid temperature through mixing. Overall volume control is achieved by longitudinal movement of the control stem and dual valving action.

3 Claims, 6 Drawing Figures

MIXING VALVE

BACKGROUND OF THE INVENTION (1) Field of the Invention

This invention relates to fluid control devices of the type utilizing a single control means for both fluid volume and mixing as normally found in valves of this type.

(2) Description of the Prior Art

Prior structures of this type have utilized a variety of control means. See for example U.S. Pat. Nos. 1,016,382; 2,975,806; 3,282,295 and 3,726,317.

In U.S. Pat. No. 1,016,382 a rotatable plug having a pair of slots engaged with a pair of ports within an outside body member to control volume and temperature of a fluid is shown.

Applicant's device has a split cylindrical mixing sleeve and a separate volume flow control.

U.S. Pat. No. 2,975,806 discloses a valve having a tubular valve element and stem with a series of O-ring gaskets for sealing the same.

Applicant's invention has a split cylindrical sleeve that acts as a compression seal as well as a mixing device.

In U.S. Pat. No. 3,282,295 a mixing valve is shown having O-rings to form a seal around a split cylinder acting as a mixing means.

Applicant discloses a control stem and split cylindrical sleeve having walls of varying thicknesses to assure a seal with the cylindrical body member, without the need of O-ring seals around the inlet and outlet ports.

U.S. Pat. No. 3,726,317 shows a bottom outlet grommit mixing valve with an apertured control stem and a number of O-rings to assure a fluid seal between the inlets and control valve stem.

Applicant's invention utilizes a split cylindrical sleeve of a flexible nature and movable control stem for a fluid tight seal around the inlet and dual control flow by longitudinal movement of the control stem.

SUMMARY OF THE INVENTION

A mixing valve comprising a cylindrical housing, a control stem rotatably positioned therein, a flexible split cylindrical sleeve having a mixing port therein is positioned in the housing in sealing relation and in operative relation to said control stem. The arrangement is such that rotation of the stem and sleeve controls communication of said mixing port with spaced inlet ports in said housing and a mixing chamber in the sleeve and housing communicates with an outlet port.

DESCRIPTION OF THE PREFERRED EMBODIMENT

Figure 1:
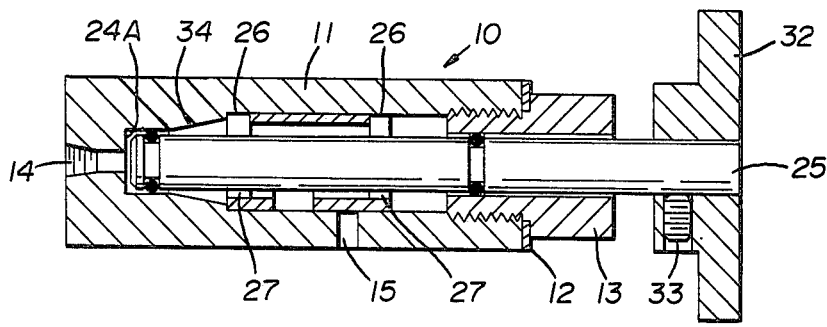
FIG. 1 is a sectional view of the mixing valve in closed position.
Figure 4:
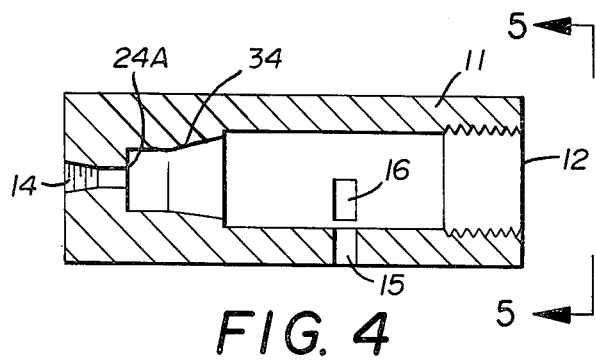
FIG. 4 is a sectional view of the cylindrical housing seen in FIG. 1.
Figure 5:
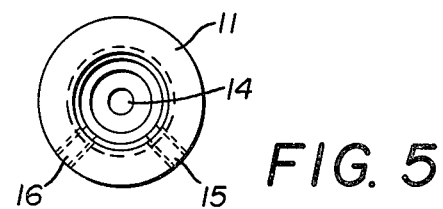
FIG. 5 is an end view on lines 5—5 of FIG. 5.

A mixing valve as seen in FIGS. 1, 4 and 5 of the drawings is generally indicated at 10 comprises a cylindrical housing 11 having an internally threaded open end 12 in which a support and guide nut 13 is located. An outlet port 14 is positioned centrally in the opposite end of the cylindrical housing 11. A pair of inlet ports 15 and 16 are circumferentially spaced in relation to one another in the cylindrical housing 11 at points midway between said end 12 and opposite end thereof.

Figure 2:
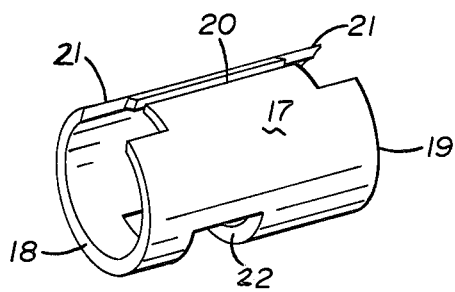
FIG. 2 is an enlarged perspective view of the split cylindrical sleeve seen in FIG. 1.

A split cylindrical sleeve 17 as seen in FIGS. 1 and 2 of the drawings has ends 18 and 19 and longitudinally extending edge portions 20 and 21 defining the split therein. The split cylindrical sleeve 17 is of a varying wall thickness tapering progressively from its thickest section opposite the split therein to the longitudinal edge portions 20 and 21 which are substantially thinner than said thickest section. The progressively tapering thickness of the split cylindrical sleeve 17 from its thickest longitudinal section opposite the split therein to the longitudinal edges defined by the split increases the resiliency thereof to a greater extent than the resiliency of the material of the sleeve 17 itself. The split cylindrical sleeve is accordingly self tensioning and positions itself in tensioned engagement against the cylindrical valve chamber formed by the cylindrical housing 11. The ends 18 and 19 of the split sleeve 17 are notched inwardly co-extensively with the edge portions 20 and 21 which define the split.

A rectangularly shaped mixing port 22 is in the cylindrical sleeve 17 opposite the split therein and adjacent the end 18.

Figure 3:
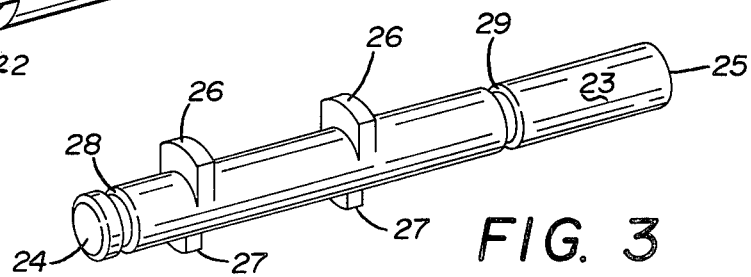
FIG. 3 is an enlarged perspective of the control stem seen in FIG. 1.

Referring now to FIGS. 3 and 4 of the drawings, a control stem 23 having ends 24 and 25 extends co-axially through the split cylindrical sleeve 17 and into the cylindrical housing 11. The control stem 23 has a pair of positioning tabs 27 spaced in relation to one another and opposite to a pair of spacing tabs 27 extending radially outwardly from the control stem 23. The positioning tabs 26 are engaged in the notches in the ends of the split cylindrical sleeve 17 allowing rotation and linear movement of the sleeve with the control stem 23. The spacing tabs 27 engage against the inner surface of the cylindrical sleeve 17 and maintain the sleeve 17 in contact with the cylindrical housing 11. A pair of annular grooves 28 and 29 are formed in the control stem 23 in spaced relation to one another with the groove 28 being adjacent the end 24 and the groove 29 spaced inwardly of the opposite end 25 of the stem 23. A pair of O-rings 30 and 31 are respectively positioned in said grooves 28 and 29.

By referring to FIGS. 1 and 4 of the drawings, it will be seen that the end portion of the cylindrical housing 11 adjacent the outlet port 14 has a valve seat in the form of a straight bore 24A in which the end 24 of the stem 23 moves and is sealed with respect thereto by the O-ring 30. The bore continues inwardly in a conical bore section 34. Movement of the end 24 of the control stem 23 and O-ring 30 into the straight bore 24A stops fluid flow through the outlet port 14. Movement of the end 24 and O-ring 30 into the conical bore section 34 progressively changes fluid flow through the outlet port 14.

Figure 6:
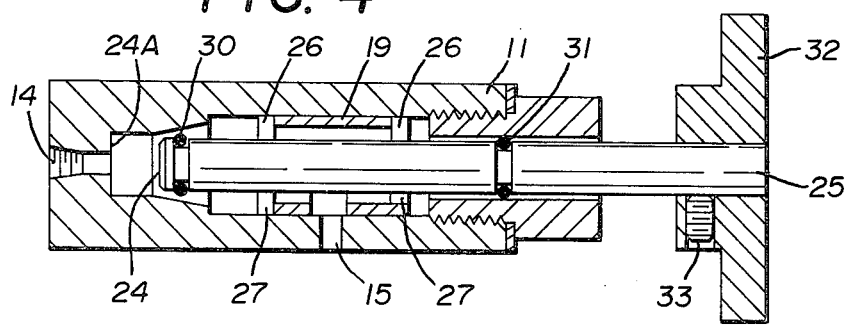
FIG. 6 is a sectional view of the mixing valve in open position.

Referring now to FIG. 6 of the drawings, it will be seen that the mixing valve 10 is shown with the control stem 23 in an open position permitting fluid to flow from one or both inlet ports 15 and 16 through the split cylindrical sleeve 17 into the cylindrical housing 11 and out through the outlet port 14. A handle 32 is secured to the other end 25 of the control stem 17 by a set screw 33. Rotation of the handle 32 will result in rotation of the control stem 23 and without any change in its longitudinal position will produce increased registry of the mixing port 22 with one of the inlet ports; for example port 15, with a corresponding decrease in registry (of the mixing port 22) with the other inlet port 16 so that the proportional flow from each inlet port is varied.

It will also be evident from FIGS. 1 and 4 of the drawings that longitudinal movement of the control stem 23 will vary overall flow rate by a first valving action between the control stem end 24 and the straight bore 24A adjacent the outlet port 14 and a second valving action where the mixing port 22 and the inlet ports 15 and 16 will register. The registration of the port 22 and the inlet ports 15 and 16 always takes place just before the opening of the first valving action defined by the control stem end 24 and the valve bore 24A.

In the arrangement shown in FIG. 1 of the drawings, the control stem 23 and the split cylindrical sleeve 17 movably engaged therewith are secured within the cylindrical housing 11 by said support and guide nut 13. The split cylindrical sleeve 17 is formed of a resilient flexible material to assure a fluid tight sealing relation between said sleeve 17 and the inner surface of the cylindrical housing 11 and as formed is of a larger outer diameter than the inner diameter of the cylindrical housing 11 and must be partially collapsed to be positioned therein. The split cylindrical sleeve 17 thus is in tensioned engagement with the cylindrical housing 11 and this results in an excellent fit due to the relation of the elastic properties of the plastic materials of which the valve is formed.

Additionally, the sleeve 17 is not directly attached to the control stem and is therefore free to expand and set itself into the cylindrical housing 11.

It will thus be seen that a new and useful mixing valve has been disclosed which can be easily molded of plastic materials and although but one embodiment of the present invention has been illustrated and described, it will be apparent to those skilled in the art that various changes and modifications may be made therein without departing from the spirit of the invention and having thus described my invention.

What I claim is:

1. In a fluid flow control valve operable as a hot water mixing faucet, a cylindrical valve chamber having an outlet port in one end and first and second inlet ports in axially spaced relation to said outlet port, said inlet ports positioned adjacent one another circumferentially of said valve chamber, a guide nut and seal closing the other end of said cylindrical valve chamber, a control stem disposed axially of said cylindrical valve chamber and movably positioned through said guide nut and seal, a split resilient expandable sleeve positioned in said cylindrical valve chamber for axial and rotary movement, said split sleeve having a mixing port therein opposite said split therein, longitudinally spaced oppositely disposed radially extending tabs on said control stem for engagement with the interior and the ends of said split sleeve for moving said split sleeve rotatably and longitudinally, one end of said control stem being disposed adjacent said outlet port for valving registry therewith and said mixing port in said sleeve being located for selective registry with said adjacent inlet ports in said cylindrical valve chamber when said control stem and split sleeve are moved axially and rotated relative to said inlet ports wherein some of said tabs on said control stem engage the inner surface of said expandable sleeve so as to space the same with respect to the stem and wherein some of said tabs on said stem engages notches in the ends of said expandable sleeves.

2. The fluid control valve set forth in claim 1 and wherein said split resilient expandable sleeve is relatively thick in its area opposite said split therein and progressively thinner circumferentially toward said split therein so that its thinnest sections are adjacent the split and wherein said inlet port is in its thickest section opposite said split.

3. The fluid control valve set forth in claim 1 and wherein said outlet port in said cylindrical valve chamber defines a valve seat and has an area of progressively increasing diameter inwardly thereof and wherein said one end of said control stem is movable into and out of said valve seat and the area of increasing diameter.

* * * * *